US010258938B2

(12) United States Patent
Gaeta et al.

(10) Patent No.: US 10,258,938 B2
(45) Date of Patent: Apr. 16, 2019

(54) BOTTLING SYSTEM

(71) Applicant: JETSTREAM WINE TECHNOLOGIES INC., North Reading, MA (US)

(72) Inventors: Cheryl Gaeta, Reading, MA (US); David G. Kmetz, Douglas, MA (US); Michael J. Pelosi, Winthrop, MA (US)

(73) Assignee: Jetstream Wine Technologies, Inc., Worcester, MA (US)

( * ) Notice: Subject to any disclaimer, the term of this patent is extended or adjusted under 35 U.S.C. 154(b) by 219 days.

(21) Appl. No.: 14/960,590

(22) Filed: Dec. 7, 2015

(65) Prior Publication Data

US 2017/0157575 A1 Jun. 8, 2017
US 2017/0259220 A9 Sep. 14, 2017

Related U.S. Application Data

(60) Provisional application No. 62/147,517, filed on Apr. 14, 2015, provisional application No. 62/088,594, filed on Dec. 6, 2014.

(51) Int. Cl.

| | |
|---|---|
| ***B01F 3/04*** | (2006.01) |
| ***B01F 5/04*** | (2006.01) |
| ***B01F 5/06*** | (2006.01) |
| ***B65D 1/02*** | (2006.01) |
| ***B65D 23/04*** | (2006.01) |
| ***C12G 1/00*** | (2019.01) |

(52) U.S. Cl.
CPC ........ *B01F 3/04794* (2013.01); *B01F 5/0644* (2013.01); *B01F 5/0669* (2013.01); *B01F 5/0676* (2013.01); *B65D 1/023* (2013.01); *B65D 23/04* (2013.01); *C12G 1/00* (2013.01); *B01F 2003/04872* (2013.01); *B01F 2215/0072* (2013.01)

(58) Field of Classification Search
CPC ............ B01F 2215/0072; B01F 5/0428; B01F 13/002; B01F 3/04794; B01F 3/0446; B01F 3/04503; B01F 2003/049; B01F 3/04; B01F 5/04; A47G 23/0241; B65D 47/06
See application file for complete search history.

(56) References Cited

U.S. PATENT DOCUMENTS

| | | | |
|---|---|---|---|
| 3,091,373 | A | 5/1963 | Kirschenbaum |
| 9,399,197 | B2 | 7/2016 | Graham |
| 2006/0204414 | A1 | 9/2006 | Warner et al. |
| 2010/0091605 | A1 | 4/2010 | Rasmussen et al. |
| 2010/0124594 | A1 | 5/2010 | Burroughs et al. |
| 2012/0074092 | A1 | 3/2012 | Devoy et al. |

(Continued)

FOREIGN PATENT DOCUMENTS

| | | | |
|---|---|---|---|
| BE | 481212 | A | 4/1948 |
| EP | 1882515 | A1 | 1/2008 |
| WO | 2016/090374 | A1 | 6/2016 |

OTHER PUBLICATIONS

International Search Report/Written Opinion dated Apr. 21, 2016, in counterpart Intl. Application No. PCT/US2015/64312.

(Continued)

*Primary Examiner* — Hong T Yoo
(74) *Attorney, Agent, or Firm* — Duane Morris LLP

(57) ABSTRACT

A container system for liquids, including an in-container mixer/aerator in the exit throat of the container. The mixer/aerator is a cylinder, having axial peripheral grooves, and and axial central bore, divided by axial vanes.

19 Claims, 3 Drawing Sheets

(56) References Cited

U.S. PATENT DOCUMENTS

| | | | |
|---|---|---|---|
| 2012/0156345 | A1 | 6/2012 | Agarwal et al. |
| 2013/0319253 | A1 | 12/2013 | Smith |
| 2016/0175782 | A1 | 6/2016 | Lau |

OTHER PUBLICATIONS

European Search Report dated Jun. 22, 2018, in corresponding EP Patent Application No. 15866325.2.

International Search Report and Written Opinion issued in connection with corresponding PCT patent application No. PCT/US2018/016792, 11 pages.

FIG. 1
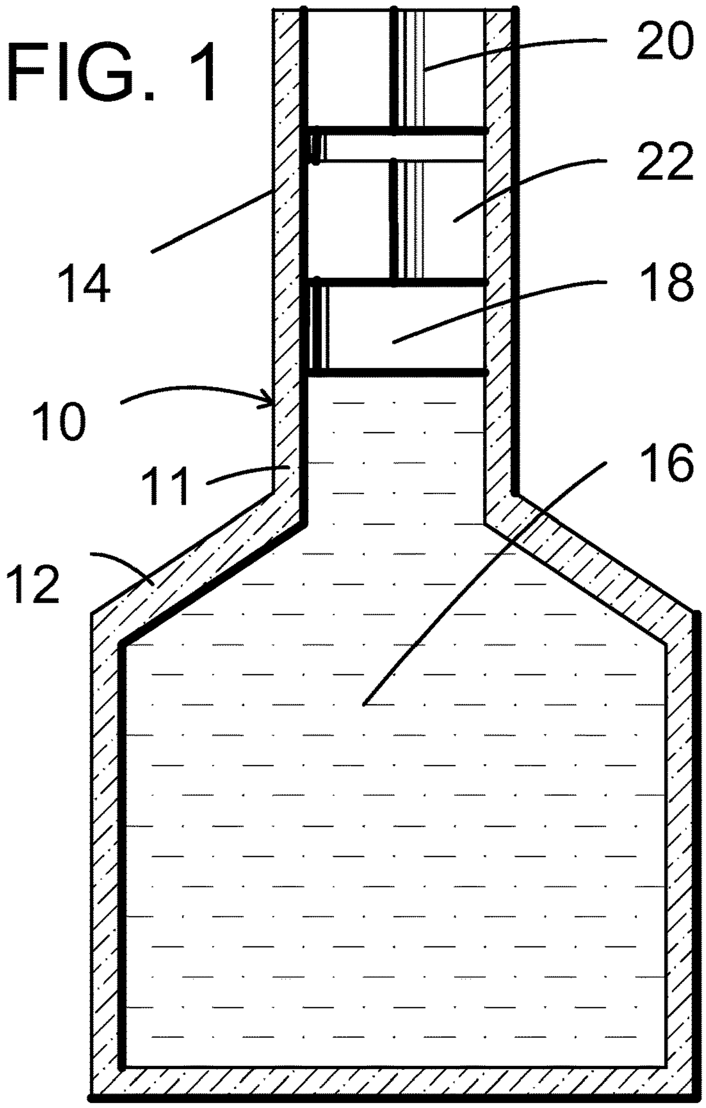
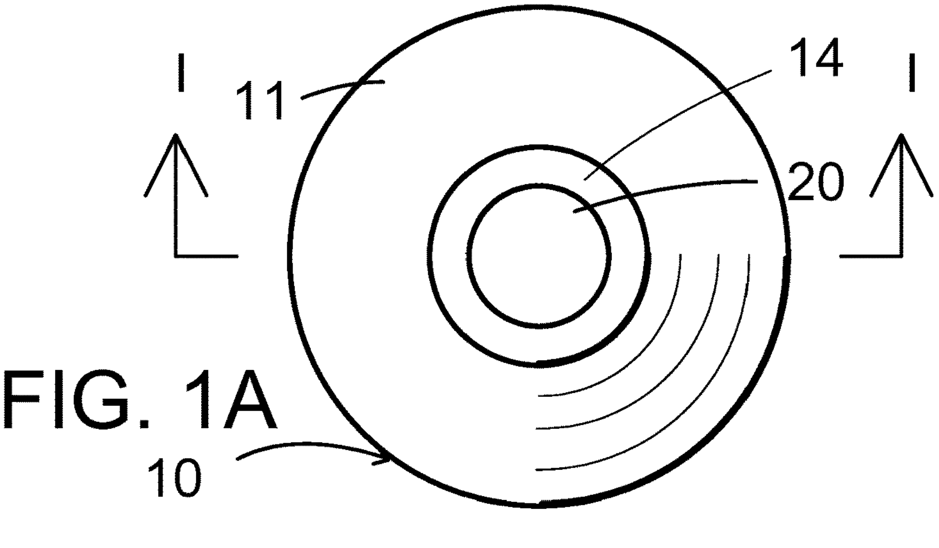
FIG. 1A

BOTTLING SYSTEM

CROSS-REFERENCE TO RELATED APPLICATIONS

This application claims priority to U.S. Provisional Patent Application No. 62/147,517, filed Apr. 14, 2015, and to U.S. Provisional Patent Application No. 62/088,594, filed Dec. 6, 2014, the entireties of which are incorporated by reference herein in their entireties.

FIELD OF THE INVENTION

This invention involves an in-container system for enhancing the turbulence and aeration of a liquid in a container.

BACKGROUND

Some beverages, such as wine, benefit from "breathing", the process of removing the beverage from its storage container and exposing the beverage to air and turbulence. The process normally takes considerable time and can be inconvenient. What is needed is a system for making the "breathing" procedure more efficient and convenient.

SUMMARY OF THE INVENTION

The invention involves a container system for liquids, comprising a container for a liquid, a throat on the container which allows liquid to be poured form the container, a mixer/aerator in the throat of the bottle, said mixer/aerator having a cylindrical outer surface, said mixer/aerator having a plurality of axial grooves around the entire periphery of the cylindrical outer surface, said mixer/aerator having an axial bore, said mixer/aerator having an axial divider, that divides the bore into a plurality of axial sub-bores. The container system divider comprises an plurality of flat or curved vanes connected to one another at the axis of the mixer/aerator. The liquid could be wine.

The invention also involves a mixer/aerator, comprising a cylindrical outer surface, a plurality of axial grooves around the entire periphery of the cylindrical outer surface, an axial bore, and an axial divider, that divides the bore into a plurality of axial sub-bores. The mixer/aerator divider comprises an plurality of flat or curved vanes connected to one another at the axis of the mixer/aerator. The liquid could be wine.

The invention also involves a method for mixing and aerating a liquid, comprising the step of pouring a liquid from a container through the throat of the container, and through a mixer/aerator positioned in the throat of the container, said mixer/aerator, comprising a cylindrical outer surface, a plurality of axial grooves around the entire periphery of the cylindrical outer surface, an axial bore, an axial divider, that divides the bore into a plurality of axial sub-bores. The divider comprises an plurality of flat or curved vanes connected to one another at the axis of the mixer/aerator. The liquid could be wine.

The mixer/aerator is symmetrical so that the mixer/aerator function works independent of the orientation of the container as the pouring occurs. As the liquid pours through the lower portion of the mixer/aerator, the external air also passes through the upper portion of the mixer/aerator to fill the gas space in the container, and causes in the liquid flow.

The Market: Benefits of the Present Invention to the Wine Maker & Consumer

Despite the huge boost in wine consumption in the past decade, knowledge of the intricacies and ritual of wine drinking devised, in most cases, for long bottled vintages to achieve proper taste. The present device will benefit the producers of red wines (i.e., Cabernet Sauvignon, Zinfandel, etc)—Wines of this nature are designed with the knowledge that proper oxidation or aeration of the beverage will lead to the peak flavor, aroma and overall enjoyment of the wine. However, barring the use of decanters and aftermarket aeration systems, which are costly, hard to clean and not widely used by the average wine consumer, there is no way for the producer of a wine to ensure his consumer is enjoying his product to its fullest. Use of the present device will provide this ability at a marginal cost to ensure greater enjoyment of the product, with ROI being increased brand loyalty and sales. The retail customer enjoys a better product experience and service industry use will ensure faster turn-around on by the glass and by the bottle service along with increased customer satisfaction. Overall a new level of enjoyment of red wine will be opened to a much larger audience than ever before.

Because of the similarities in chemistry between red wines and other fruit-based beverages, it appears that all fruit-based beverages, alcoholic and non-alcoholic, would benefit, to some extent, from aeration after storage. Thus, this invention would be of use for enhancing the characteristics of all fruit-based beverages such as red wines, rose wines, white wines, and non-alcoholic fruit-based beverages, and any other beverages that would benefit from aeration after storage. A device, formed in material similar to cork, that fits into a neck opening and allows gases to pass in while fluids pour out, thereby agitating and aerating the fluid, increasing exposure to gasses and facilitating aeration. The device consists of a hollow tunnel on center and slots around the perimeter of the device.

The present device is symmetrically designed for the explicit purpose of negating any effects of bottle orientation during pour. The device will work as intended regardless of angle or rotation of bottle's long axis, giving it a distinct advantage of devices currently on the market.

The present device is sized in relation to commonly used bottle enclosures (corks) so that the device and be used in standard bottling equipment with minimal to no modifications necessary.

The present device is made from recyclable synthetic cork material, allowing it to be disposed of/recycled with the bottle, requiring no retail user interaction.

Given the design and proposed manufacturing processes (i.e., extrusion) production costs for the p resent device are exponentially lower than current after-market systems, allowing for smaller investment for producers who choose to use this system.

How is the Product Designed.

The present device is a small cylinder made from synthetic and inert materials and designed to be inserted into any standard wine bottles by the wine maker. Featuring fluted sides and a chambered center opening.

How Does the Product Function.

By residing in the neck of the bottle, the present device regulates the flow of air entering the bottle, inducing bubbles which accelerate oxidation as well as introduce agitation to the wine as it enters the center chamber. The chambered center opening further splits the volume of wine exiting the bottle into multiple streams. These streams recombine during the pour, further increasing agitation and oxidation of the wine. The device requires no input or interaction with the end user and is disposed of once the bottle is empty.

Aspects

The present is an industrial in-bottle wine aeration device designed for cost effective manufacturing, trouble free installation and zero need for consumer level interaction. It is designed to be inserted into the neck of a wine bottle by the winemaker during bottling and disposed of by the consumer when finished.

Production & Implementation:

Made from Affinity Plastomer, an FDA approved material used in artificial corks, the present device will be manufactured in a clean room environment using standard extrusion forming methods. The device is designed to take advantage of cost effective production methods along with proven and accepted wine-industry materials. The present device will use industry standard bottles and bottling equipment to be implemented, requiring minimal modification to bottling lines, be they in house or mobile.

BRIEF DESCRIPTION OF THE DRAWINGS

FIG. 1 is a sectional front elevation view, taken along view 1-1 of FIG. 1A, of a container system for liquids, showing the location of the in-container mixer/aerator in the exit throat of the container, FIG. 1A is a plan view of a container system for liquids shown in FIG. 1.

DESCRIPTION OF THE INVENTION

Figure 4:
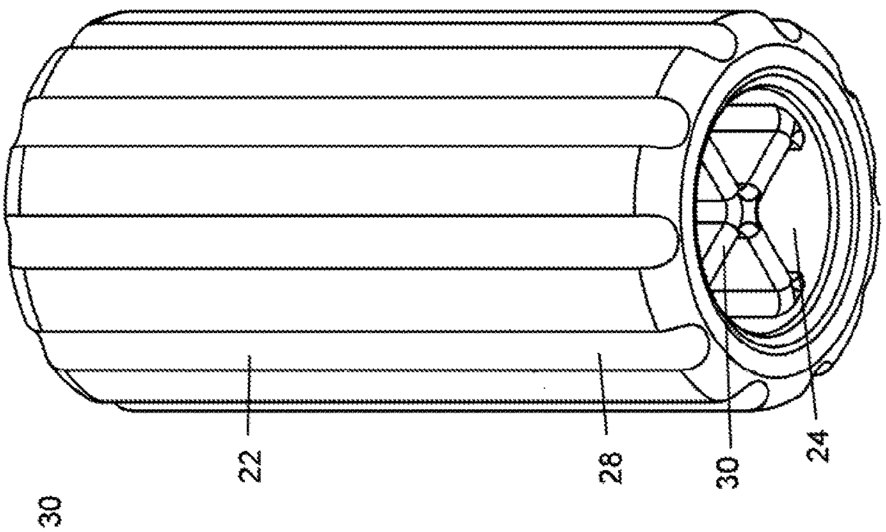
FIG. 4 is a perspective view of the bottom of a mixer, shown in FIG. 2, embodying the principles of the present invention.

Referring first to FIG. 1, FIG. 1 is a sectional front elevation view, taken along view 1-1 of FIG. 1A, of a container system for liquids, showing the location of the in-container mixer/aerator in the exit throat of the container. The bottling system, denoted generally by the numeral 10, includes a bottle 11, that includes a hollow body 12 and a neck 14. The body 12 contains a liquid 16, such as wine. The neck 14 surrounds a hollow bore 18 that allows the liquid 16 to exit the bottle 11.

At the outboard end of the bore 18, is a cork 20 that is removable to allow the liquid 16 to be poured from the bottle 11.

Inward of the cork is a mixer 22, that includes axial channels 24 that allow liquid to turbulently exit the bore 18, and air to enter the bore 18. The turbulent exit of the liquid 16 enhances the "breathing" of the exiting liquid 16.

FIG. 1A is a plan view of a container system for liquids shown in FIG. 1.

Figure 3:
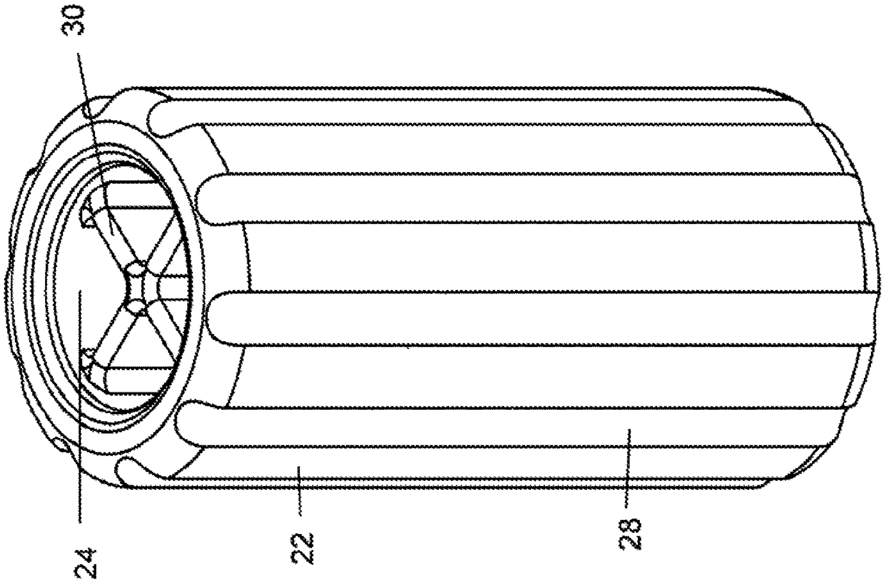
FIG. 3 is a perspective view of the top of a mixer, shown in FIG. 2, embodying the principles of the present invention.
Figure 2:
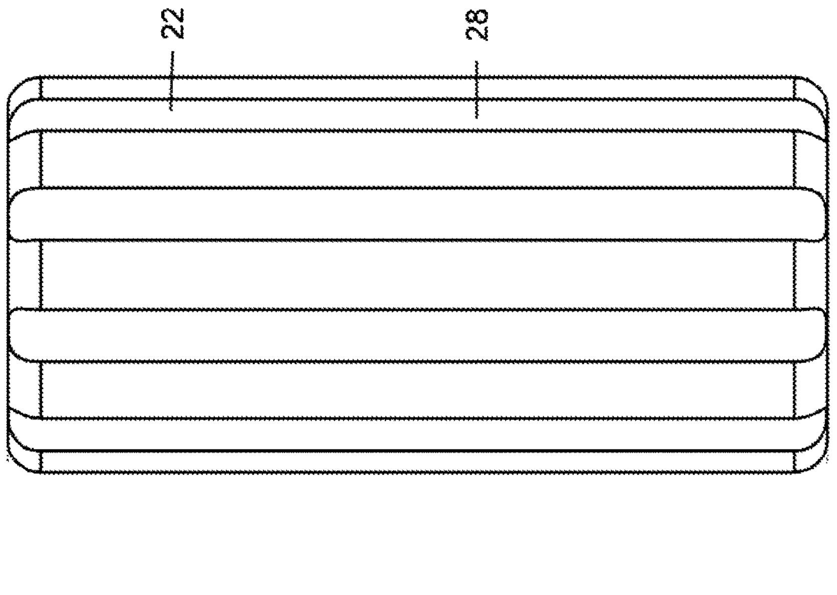
FIG. 2 is a front elevation view of a mixer embodying the principles of the present invention.
Figure 5:
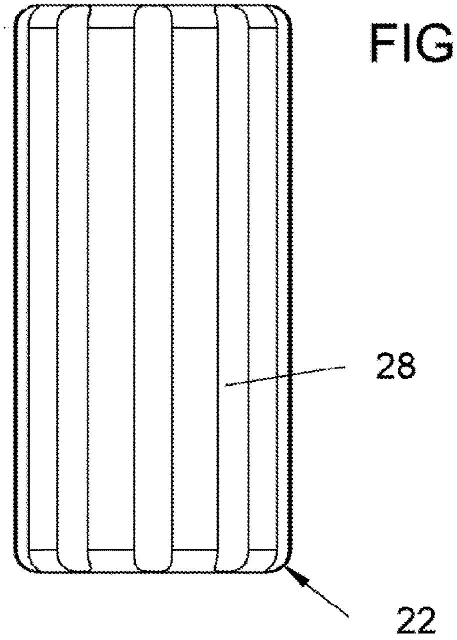
FIG. 5 is a front elevation view of a mixer, shown in FIG. 2, embodying the principles of the present invention.
Figure 6:
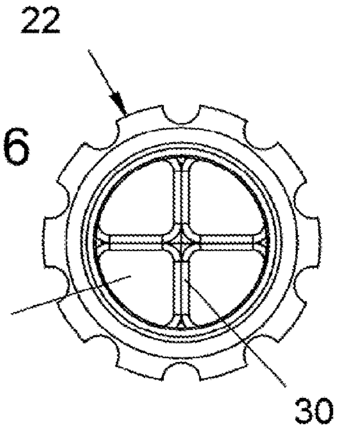
FIG. 6 is a bottom view of a mixer, shown in FIG. 2, embodying the principles of the present invention.
Figure 7:
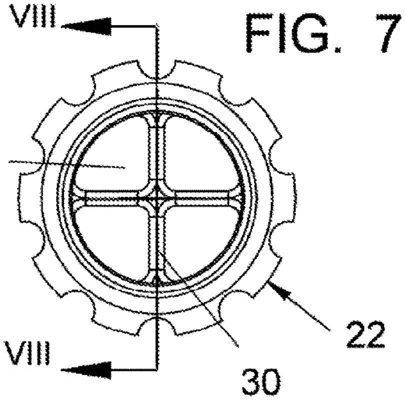
FIG. 7 is a top view of a mixer, shown in FIG. 2, embodying the principles of the present invention.
Figure 8:
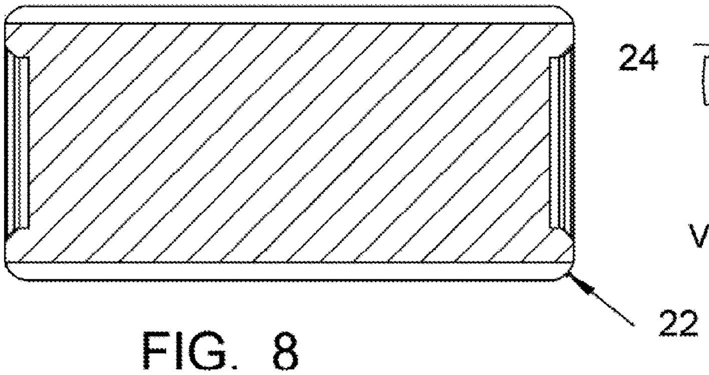
FIG. 8 is a section view, taken along line VIII-VIII of FIG. 7, of a mixer, shown in FIG. 2, embodying the principles of the present invention.
Figure 9:
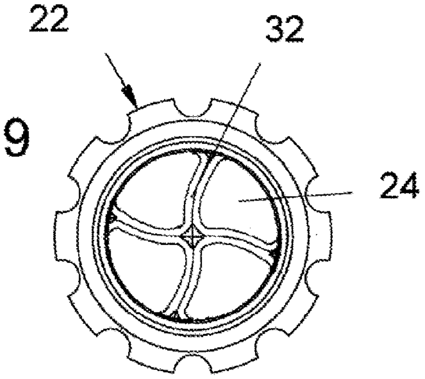
FIG. 9 is a top view of a variation of the invention in which the axial internal vanes are curved instead of flat.
Figure 10:
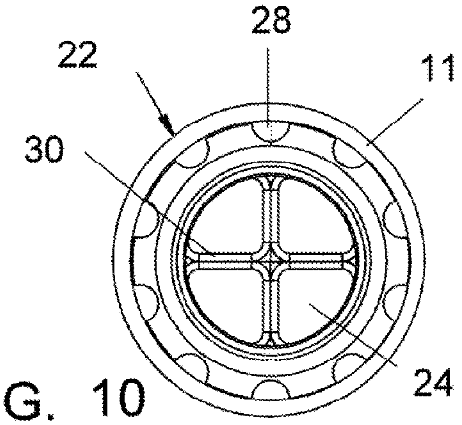
FIG. 10 is top view of the mixer/aerator as seen through the open end of the bottle 11.

FIG. 2 is a front elevation view of a mixer embodying the principles of the present invention, FIG. 3 is a perspective view of the top of a mixer, shown in FIG. 2, embodying the principles of the present invention, FIG. 4 is a perspective view of the bottom of a mixer, shown in FIG. 2, embodying the principles of the present invention, FIG. 5 is a front elevation view of a mixer, shown in FIG. 2, embodying the principles of the present invention, FIG. 6 is a bottom view of a mixer, shown in FIG. 2, embodying the principles of the present invention, FIG. 7 is a top view of a mixer, shown in FIG. 2, embodying the principles of the present invention, FIG. 8 is a section view, taken along line VIII-VIII of FIG. 7, of a mixer, shown in FIG. 2, embodying the principles of the present invention, FIG. 9 is an top view of a variation of the invention in which the axial internal vanes are curved instead of flat, and FIG. 10 is top view of the mixer/aerator as seen through the open end of the bottle 11.

The invention claimed is:

1. A container system, comprising:

a container having a hollow body extending from a first end to a second end, a first portion of the container having a first maximum diameter and a second portion of the container having a second maximum diameter, the first maximum diameter being greater than the second maximum diameter; and a mixer/aerator disposed entirely within the second portion of the container, said mixer/aerator having a central longitudinal axis extending from a first end to a second end and having a cylindrical outer surface that engages an inner surface of the second portion of the container, said outer surface of the mixer/aerator defining a plurality of grooves extending from the first end of the mixer/aerator to the second end of the mixer/aerator such that a respective passage is defined by each groove of the plurality of grooves and an inner surface of the container, and said mixer/aerator defining a bore extending from the first end of the mixer/aerator to the second end of the mixer/aerator, wherein the bore is divided by a divider that comprises a plurality of vanes, each of the plurality of vanes having two faces with a thickness between the two faces, the faces being parallel to the central longitudinal axis and the thickness of each of the plurality of vanes being substantially uniform.

2. A container system as recited in claim 1, wherein each of the plurality of vanes extends radially from the central longitudinal axis.

3. The container system of claim 2, wherein each vane of the plurality of vanes is connected to another vane of the plurality of vanes at an axis of the mixer/aerator.

4. A container system as recited in claim 1, wherein the faces of each of the plurality of vanes define a curve transverse to the central longitudinal axis, the curve being uniform from the first end of the mixer/aerator to the second end of the mixer/aerator.

5. The container system of claim 4, wherein each vane of the plurality of vanes is connected to another vane of the plurality of vanes at an axis of the mixer/aerator.

6. The container system of claim 1, wherein the mixer/aerator is symmetrical about the central longitudinal axis.

7. The container system of claim 1, wherein the container is a wine bottle.

8. The container system of claim 1, further comprising a cork disposed at least partially within the second portion of the body of the container such that the cork is disposed adjacent to the mixer/aerator.

9. A mixer/aerator, comprising:

a body having a central longitudinal axis extending from a first end to a second end and having a cylindrical outer surface defining a plurality of grooves extending from the first end of the body to the second end of the body, the body further defining a bore extending through the body from the first end of the body to the second end of the body, wherein the bore is divided by a divider that comprises a plurality of vanes, each of the plurality of vanes having two faces with a thickness between the two faces, the faces being parallel to the central longitudinal axis and the thickness of each of the plurality of vanes being substantially uniform, wherein the body is dimensioned to be received entirely within a neck of a bottle.

10. A mixer/aerator as recited in claim 9, wherein each of the plurality of vanes extends radially from the central longitudinal axis.

11. The mixer/aerator of claim 10, wherein each vane of the plurality of vanes is connected to another vane of the plurality of vanes at an axis of the mixer/aerator.

12. A mixer/aerator as recited in claim 9, wherein the faces of each of the plurality of vanes define a curve transverse to the central longitudinal axis, the curve being uniform from the first end of the body to the second end of the body.

13. The mixer/aerator of claim 12, wherein each vane of the plurality of vanes is connected to another vane of the plurality of vanes at an axis of the mixer/aerator.

14. The mixer/aerator of claim 9, wherein the grooves of the plurality of grooves are symmetrically arranged about the outer surface of the body.

15. The mixer/aerator of claim 9, wherein the mixer/aerator is formed from an inert material.

16. A method, comprising:

providing a hollow container having an open first end;

filling the hollow container at least partially with a liquid;

inserting a mixer/aerator into the open first end such that the mixer/aerator is received entirely within the hollow container and an outer surface of the mixer/aerator contacts an internal surface of the hollow container, wherein the mixer/aerator includes:

a body having a central longitudinal axis extending from a first end to a second end and defining a bore extending from the first end of the body to the second end of the body such that the bore extends entirely through the body, wherein the bore is divided by a divider that comprises a plurality of vanes, each of the plurality of vanes having two faces with a thickness between the two faces, the faces being parallel to the central longitudinal axis and the thickness of each of the plurality of vanes being substantially uniform, wherein the outer surface of the mixer/aerator defines a plurality of grooves extending from the first end of the body to the second end of the body, each of the plurality of grooves providing a respective passage with the internal surface of the hollow container; and sealing the first end of the hollow container with the mixer/aerator and the liquid disposed within the hollow container.

17. The method of claim 16, wherein sealing the first end of the hollow container includes inserting a cork into the first end of the hollow container.

18. The method of claim 16, wherein the liquid includes wine.

19. The method of claim 16, wherein the liquid includes a fruit-based beverage.

* * * * *